United States Patent [19]

Kaemmerer

[11] 4,175,271
[45] Nov. 20, 1979

[54] HELICAL VIDEO TAPE INSERT RECORDING EDITING METHOD WITH FLYING ERASE HEAD AND SERVO CONTROL

[75] Inventor: Harry Kaemmerer, Franklin Township, Somerset Couty, N.J.

[73] Assignee: American Telephone and Telegraph, New York, N.Y.

[21] Appl. No.: 830,596

[22] Filed: Sep. 6, 1977

Related U.S. Application Data

[62] Division of Ser. No. 646,063, Jan. 2, 1976.

[51] Int. Cl.² .................. H04N 5/795; G11B 27/08; G11B 15/52
[52] U.S. Cl. ........................................ 360/14; 360/70; 360/73
[58] Field of Search ................ 360/14, 70, 73, 13, 360/84

[56] References Cited

U.S. PATENT DOCUMENTS

| | | | |
|---|---|---|---|
| 3,051,777 | 8/1962 | Lemelson | 360/14 |
| 3,235,670 | 2/1966 | Kihara | 360/70 |
| 3,342,949 | 9/1967 | Wessels | 360/14 |
| 3,542,949 | 11/1970 | Tanaka et al. | 360/14 |
| 3,647,951 | 3/1972 | Rose, Jr. | 360/14 |
| 3,663,766 | 5/1972 | Gotto | 360/70 |
| 3,742,132 | 6/1973 | Sangun et al. | 360/14 |
| 3,838,453 | 9/1974 | Buslik et al. | 360/70 |
| 4,005,481 | 1/1977 | Lackner | 360/60 |
| 4,044,388 | 8/1977 | Metzger | 360/70 |

FOREIGN PATENT DOCUMENTS 44-14297  12/1969  Japan ........................................ 360/38

OTHER PUBLICATIONS

Kybett, Video Tape Recorders, Sans & Co., 1974, Chapt. 10, pp. 231-251.

Primary Examiner—Raymond F. Cardillo, Jr.
Attorney, Agent, or Firm—Henry T. Brendzel; Joseph P. Kearns

[57] ABSTRACT

Disclosed is a helical scan video tape recorder having a flying sense head located upstream from a flying erase head and further upstream from a flying record/playback head. By employing a separate sense head to detect synch pulses, tension and relative speed of the video tape are controlled so as to eliminate synchronization errors in consequence of editing operations.

5 Claims, 5 Drawing Figures

HELICAL VIDEO TAPE INSERT RECORDING EDITING METHOD WITH FLYING ERASE HEAD AND SERVO CONTROL

This is a division, of application Ser. No. 646,063, filed Jan. 2, 1976.

FIELD OF THE INVENTION

This invention relates generally to editing of video signals recorded on magnetic tapes, and more particularly, to electronic editing systems of video signals in helical scan video tape recorder (VTR) systems.

Helical scan video tape recorders are generally described by Harry Kybett in *Video Tape Recorders*, Howard W. Sams & Co., Inc., 1974 (Library of Congress Catalog Card Number: 73-90285). This book is herein incorporated by reference in order to avoid unnecessarily long descriptions.

BACKGROUND OF THE INVENTION

General

In highlighting the art of helical scan recording, reference is made to FIG. 1 of this specification which illustrates some of the pertinent elements of a prior art head drum assembly. As can be seen from FIG. 1, forward moving (left to right) tape 10 passes by a conical guide-roller 20 and engages cylindrical drum 30 with the aid of roller 21. The conical shape of roller 20 causes tape 10 to slant downward as it passes by roller 21. At drum 30, the tape wraps half way around the drum, and with the aid of roller 41 passes by a conical guide-roller 40 which slants the moving tape upwards, thus nullifying the downward slant produced by roller 20. In this manner, tape 10 is made to wrap around drum 30 in a helical manner, emerging from drum 30 at a level different from that at which it entered.

Within drum 30 there is a rotating disc 300 containing a record/playback head 310 and a record/playback head 320 placed diagonally across from each other. Disc 300 rotates about an axis coincident with the axis of drum 30 and is horizontally aligned with the wrapped tape. Rollers 20 and 40 are so designed and positioned that the tape's lower edge in the neighborhood of roller 21 is at the same horizontal elevation as is the tape's upper edge in the neighborhood of roller 41; that elevation being the elevation at which disc 300 is rotating. Thus, for a stationary tape 10, it can be seen that a record/reproduce head on the circumference of disc 300 traverses a straight line upon tape 10 at a sharp angle with respect to the tape's edge. For a tape that is moving slowly with respect to the speed of rotation of disc 300, a straight line of an even sharper angle with respect to the tape's edge is produced.

FIG. 2 depicts some of the parallel tracks generated by heads 310 and 320. For example, tracks 11 and 13 may have been generated by head 310 and tracks 12 and 14 may have been generated by head 320. Conveniently, the tracks of helical VTRs (e.g., track 14) are long enough to contain the signals of a complete TV raster field. Since each TV field contains 262.5 horizontal lines, each track contains 263 blocks (e.g., blocks 141 and 142) with each block corresponding to a tape section which contains the signals of one line. Associated with the signal of each line there is a horizontal synchronization (H synch) pulse. This pulse is used to synchronize the TV receiver to the incoming signals. The H synch pulses are shown diagrammatically in FIG. 2 by line segments such as line segment 145 on track 14. Also shown in FIG. 2 is a control track 15 and an audio track 16. Audio track 16 contains the audio information corresponding to the video information within the slanted video tracks (e.g., track 14), and control track 15 contains various control signals.

Electronic Editing

Editing of a prerecorded tape contemplates the substitution of information contained in a preselected segment of a prerecorded tape with some new information. This is commonly termed "insert editing". Heretofore, there have been mainly three methods for editing a new segment onto a prerecorded tape: erasure with a main fixed erase head followed by recording; directly recording over a prerecorded tape with an increased record-head current; and erasure with a flying erase head followed by recording of the erased tape. A "flying" head, as used in the VTR art, means a head which is situated on, and is rotating with the rotating disc (300).

Prior Art

One system which employs a combination of the first two methods for editing, is described by Norman F. Bounsall in U.S. Pat. No. 3,436,489, issued Apr. 1, 1969. Therein Bounsall describes the employment of a fixed video erase head disposed upstream from the head drum, achieving therewith a complete erasure of the tape. When operating in this manner, a new signal is initially recorded directly over unerased tape. Thereafter, the recorded tracks of the new signal are on progressively increasing amounts of tape completely erased by the erase head, and finally entirely on completely erased tape.

D. B. MacLeod et al in U.S. Pat. No. 3,450,832, issued June 17, 1969, describe an apparatus for implementing the method described by Bounsall in the aforementioned patent. The described apparatus incorporates means for automatically controlling the editing operations in accordance with the Bounsall method. Disc speed and tape speed are servo-controlled, in the MacLeod et al apparatus, by recording control signals on a control track situated alongside the edge of the video tape, and by employing a separate fixed record/reproduce head to detect during playback the recorded control track signals.

In other prior art systems, a tighter control of the disc and tape speeds is obtained during playback by employing the H synch pulses to affect the speed control servos. The use of H synch pulses is possible because they can be extracted during playback from the reproduced signal, and the tighter speed control is possible because the H synch pulses are of a much higher frequency than the control track pulses. Also because of the higher frequency of the H synch pulses, the tape's tension may be controlled. During editing, however, H synch pulses are not available to the above prior art systems because no signal is reproduced and, in fact, the prerecorded signal is erased by a fixed erase head or by a flying erase head. Hence, during editing, these systems synchronize the disc and tape speeds, i.e., the tape's relative speed, to the incoming video signal, and set the tape's tension to a fixed value.

The above described prior art systems are deficient in their editing operations since the tape's tension and relative speed cannot be tightly controlled. As a consequence of this lack of tight control, upon the termination of an editing interval, H synch signals of the just edited-in information may be out of synchronization with H synch signals of the adjacent prerecorded tape by as much as a full H synch period. Upon playback of the edited tape, the synchronization error encountered at the termination edge of the edited-in segment is interpreted as a tape position and a tape tension error. In trying to correct for these apparent errors, the various servos cause a disturbance in the played-back signal.

It is an object of this invention, therefore, to remedy the above deficiencies and to provide a simple and versatile electronic editing system for helical scan VTRs.

SUMMARY OF THE INVENTION

This and other objects of the invention are achieved by detecting the synch pulses present on the prerecorded tape to be edited before the editing-in of new signals, and by employing the detected synch pulses to control the tape's tension and relative speed. This is accomplished by placing a flying sense head on the rotating disc containing the record/playback heads so as to engage the forward moving tape prior to the tape's engagement with the record/playback head, i.e., upstream from the flying record/playback head. In applications where it is desired to erase the unwanted segment of a prerecorded tape prior to the recording of new signals, a flying erase head is interposed between the flying sense head and the record/playback head.

In accordance with the principles of this invention, during normal playback, the prerecorded tape first passes by the flying sense head wherein the synch pulses are detected. These pulses are processed in appropriate circuitry to ascertain therefrom the relative speed of the tape, and a developed error voltage is applied to servomechanisms to control the relative speed and tension of the moving tape. Next, the prerecorded tape passes by the erase head, which during a playback mode operation is de-energized but which during an edit mode operation is energized to cause an erasure of the signals recorded on the passing tape. Finally, the prerecorded tape passes by the record/playback head which detects the video signal and transfers the detected signal to its destination.

DETAILED DESCRIPTION

It is a purpose of this invention to utilize, during editing, the timing information inherently available in the signals present on the prerecorded video tracks of the tape to be edited. This available timing information is contained in the periodicity of occurrence of the various synch pulses. Therefore, by detecting the prerecorded synch pulses and by comparing the periodicity of the detected pulses to a known fixed required value, the speed of the moving tape relative to disc 300 may be ascertained. The task, then, is to detect the prerecorded synch pulses during an editing interval before those pulses are erased or are over-recorded. Once the pulses are detected, conventional apparatus may be employed (as they are currently employed for playback-mode operations) to control the tape tension and relative speed.

In accordance with the principles of this invention, detection of prerecorded synch pulses is achieved by placing dedicated playback heads on the rotating disc 300 and by employing those dedicated playback heads, or flying sense heads, solely for the purpose of sensing synch pulses. These flying sense heads must be physically situated to respond to old information on the video tracks before it is destroyed by the editing process. Therefore, a flying sense head is associated with each flying record/playback head and is physically situated upstream therefrom to affect a particular point on the passing tape prior to that point being affected by the corresponding record/playback head.

In applications where it is desirable to erase the unwanted prerecorded tape segments prior to recording of new signals, it is necessary, in accordance with the principles of this invention, to interpose a flying erase head between each pair of sense and record/playback heads. This way, after the prerecorded tape is sensed for its synch pulses, it is erased by the erase head and is then recorded upon with new information.

Figure 3:
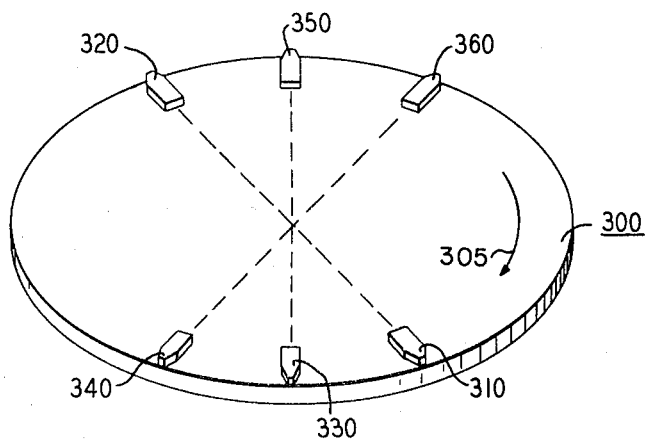
FIG. 3 illustrates a disc configuration in accordance with the principles of this invention, suitable for use in conjunction with the drum of FIG. 1.

FIG. 3 depicts one embodiment of disc 300 that is arranged, in accordance with the principles of this invention, to accept a sense head and an erase head for each record/playback head. As depicted in FIG. 3, upstream from record/reproduce heads 310 and 320 (see arrow 305 indicating direction of rotation of disc 300) are erase heads 330 and 350, respectively; and upstream from erase heads 330 and 350 are sense heads 340 and 360, respectively. The flying erase and sense heads are separated from the record/playback heads and from each other by a selected rotational angle. This angle must be sufficiently large so that the erase heads (330 and 350) do not have a deleterious effect on the operation of heads 310, 340, 320, and 360.

Figure 1:
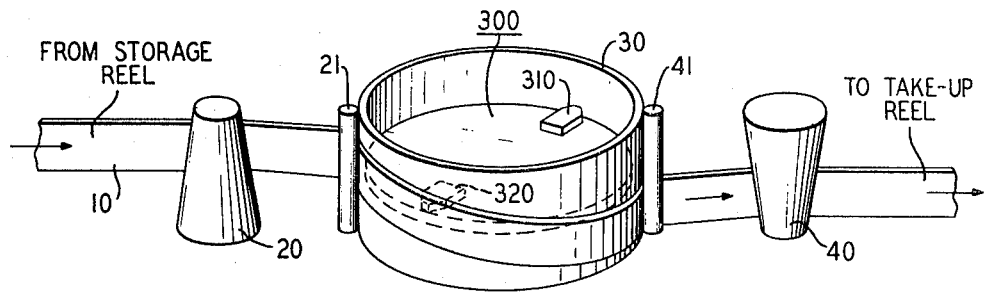
FIG. 1 depicts selected elements of a prior art helical VTR head drum as described hereinabove.
Figure 2:
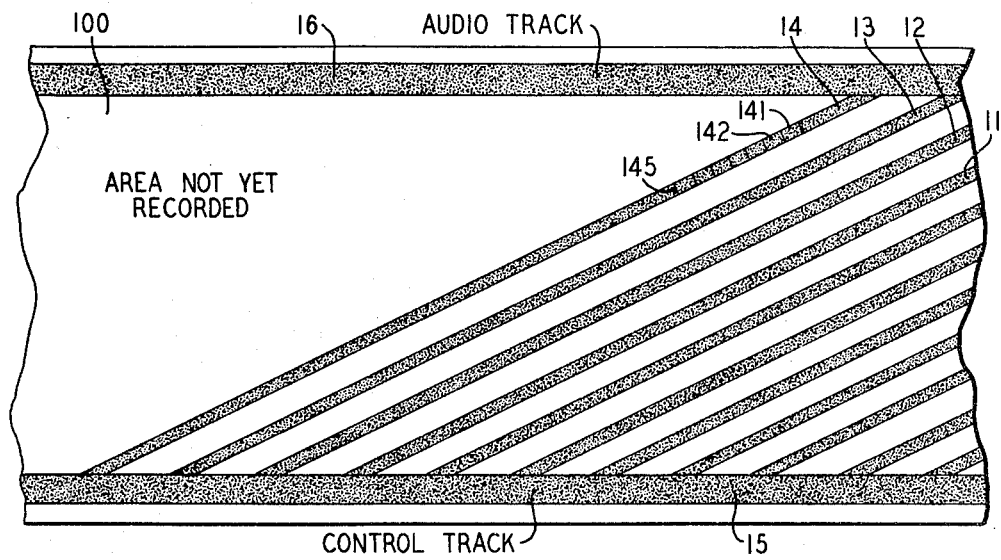
FIG. 2 illustrates the video tracks generated by the record/playback heads employed with the head drum of FIG. 1.
Figure 4:
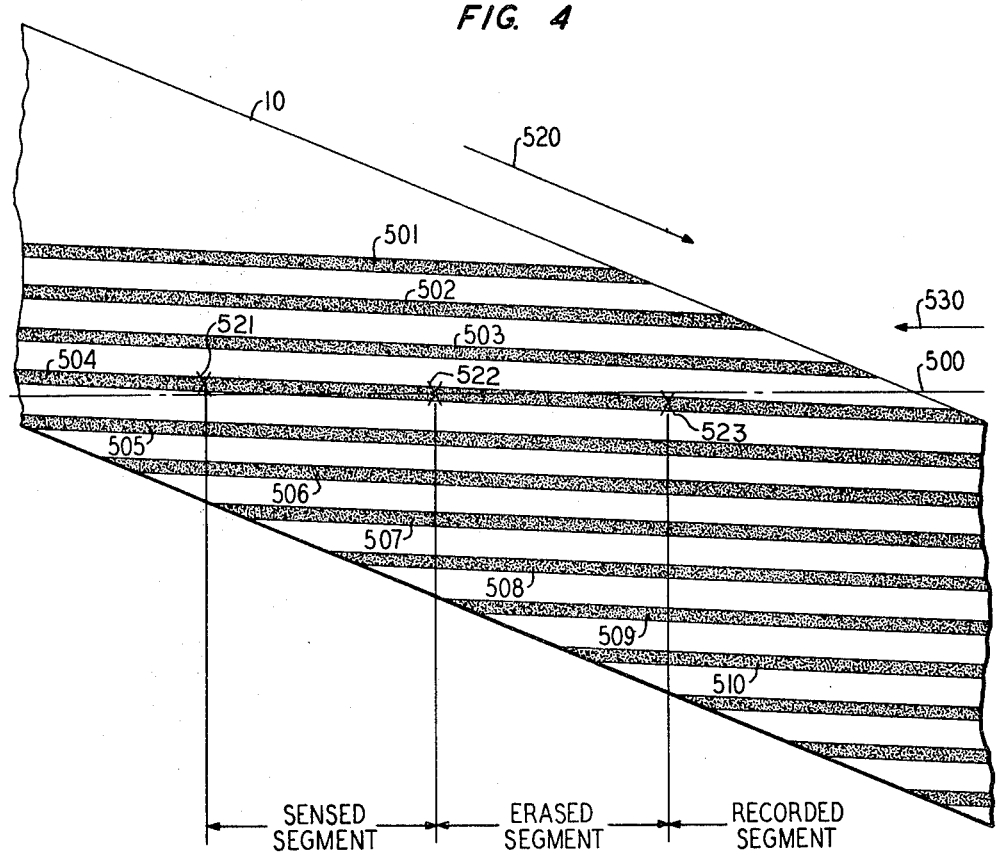
FIG. 4 clarifies the spatial positioning necessary for the various heads of the FIG. 3 disc.

Because of the forward left-to-right motion of tape 10, the angular separation between two heads corresponds to a spatial shift between the respective paths of the separated heads on tape 10. This may become clear when it is observed that the spatial shift for an angular separation of 180° between heads 310 and 320 is the spacing between adjacent video tracks. To compensate for this misalignment in the tracks produced by the various heads, for a drum arrangement as shown in FIG. 1 having tape 10 move around drum 30 downward and in a counterclockwise direction, head 330 must be positioned lower than head 340, and head 310 must be positioned lower than head 330. This is illustrated in FIG. 4 which depicts tape 10 unwrapped, so to speak, off drum 30. Arrow 520 represents the direction of travel of tape 10, line 500 represents the horizontal plane of rotation of disc 300, and arrow 530 represents the direction of travel of the perimeter of disc 300 along line 500. Tracks 501, 502 and 503 on tape 10 represent the un-edited video signal of tape 10. Tracks 505 through 510 represent the newly recorded edited video tracks. Video track 504 is shown in the process of being edited. It should be noted that tracks 501 through 510 are slanted with respect to line 500. This is caused by the movement of tape 10 as described, supra.

To provide for a proper alignment of heads 340, 330, and 310, synchronization-sensing head 340 may be placed above line 500, to coincide with track 504 at point 521; erase head 330 may be placed in line with line 500, to coincide with track 504 at point 522; and record/playback head 310 may be placed below line 500, to coincide with track 504 at point 523. In this manner, sense head 340 can detect synch pulses on track 504, erase head 330 can erase the information on track 504 providing thereby an erased tape to its right, and record/playback head 310 may record new information on track 504 providing thereby newly recorded information to its right.

Figure 5:
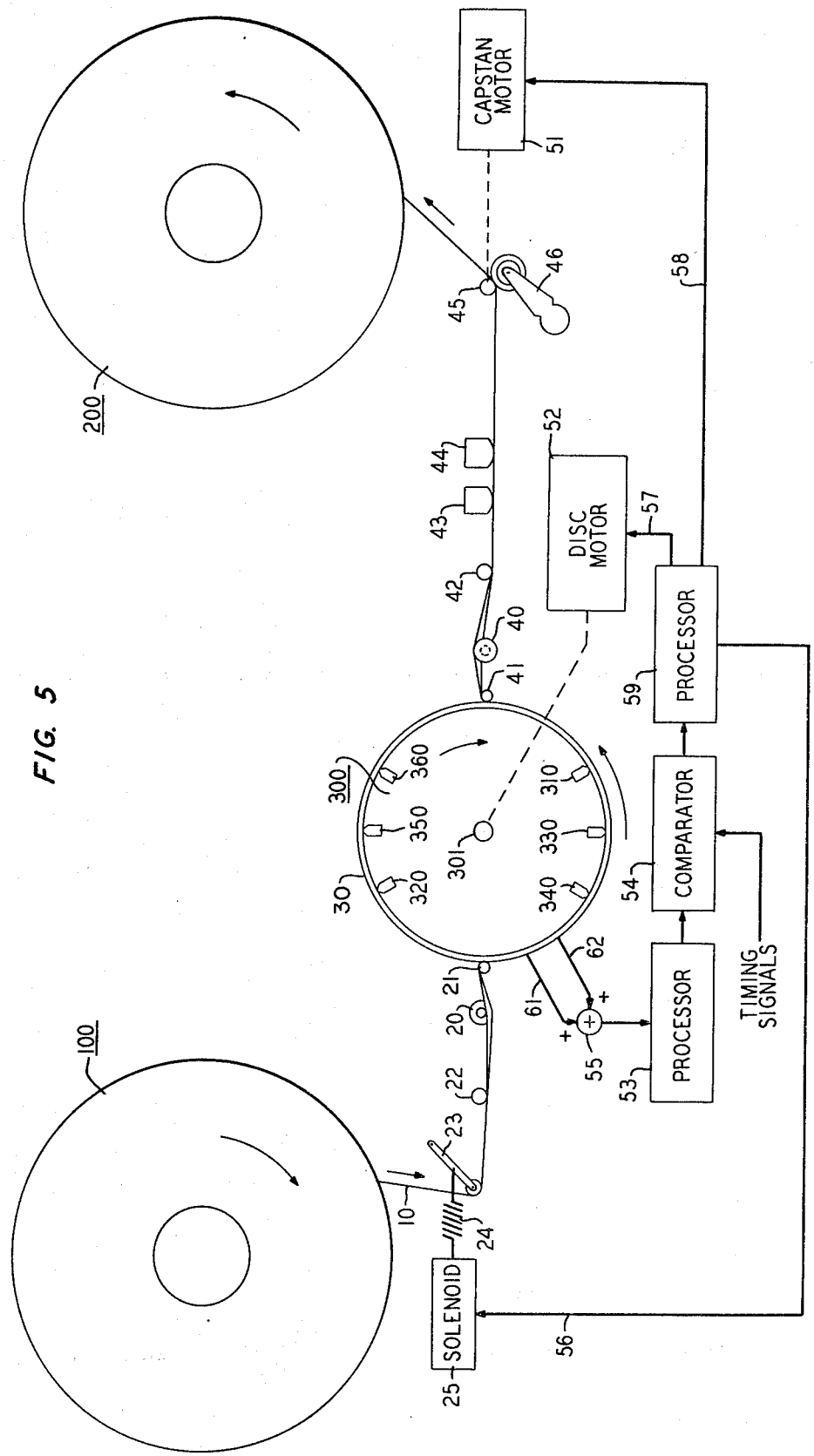
FIG. 5 depicts a general system diagram for a helical scan VTR employing the principles of this invention.

FIG. 5 illustrates some of the elements of a helical scan VTR system employing the principles of this invention. Therein, element 100 is the supply reel which rotates in a clockwise direction and thus unreels magnetic tape 10 to the right of its axis. Tape 10 is made to engage drum 30 with the aid of tension roller 23 and stationary rollers 22, 20, and 21. Upon engagement with drum 30, tape 10 is wrapped approximately halfway around the lower half of drum 30 and is made to disengage drum 30 with the aid of rollers 41, 40, and 42. Following roller 42, tape 10 passes by an audio (track) record/playback head 43 and a control (track) record/playback head 44, before it is applied to capstan 45 which with the aid of a pressure roller 46 forces tape 10 to move from left to right. Beyond capstan 45, tape 10 is reeled from the right side onto a supply reel 200 which is rotating in a counterclockwise direction.

Associated with tension roller 23 is a solenoid 25 and a spring 24 which joins roller 23 to solenoid 25. In response to appropriate control signals on lead 56, solenoid 25 exerts a force on spring 24 which causes roller mounting 23 to rotate in a clockwise or a counterclockwise direction, causing thereby an increase or a decrease, respectively, in the tension applied to tape 10.

Associated with capstan 45 is a capstan motor 51 which drives capstan 45. The speed of motor 51 is controlled via control signals on lead 58.

Within drum 30 is a rotating disc 300. Associated with disc 300 is a disc motor 52 which drives disc 300. The speed of motor 52 is controlled via control signals on lead 57.

Disc 300 contains a pair of flying sense heads 340 and 360 and a pair of flying erase heads 330 and 350. Through slip rings on shaft 301 of disc 300, the signals of sense heads 340 and 360 are provided to leads 61 and 62, respectively, which signals are added in summing network 55. The output signal of network 55 is applied to a processing network 53 wherein the line synch timing information is extracted. Processing network 51 may simply be an integrator responsive to a monostable multivibrator that is adjusted to be triggered by the synch signals at the output of network 55. With such an implementation, the output signal of processing network 53 is simply a dc signal whose amplitude is representative of the periodicity of the detected synch signals. To compare the detected periodicity with a desired periodicity it is only necessary to compare the output signal of network 53 to a preselected timing signal which is representative of the desired periodicity. This is achieved in comparison block 54 of FIG. 5.

The output signal of block 54 is applied to processor 59. Processor 59 develops the signals on leads 56, 57, and 58 which are necessary for controlling solenoid 25, disc motor 57 and capstan motor 51, respectively. The computations performed within processor 59 may be very complex or very simple, depending on the particular response characteristics which may be deemed desirable. In most applications, however, it is sufficient to have a simple percentage relationship between the three controls. That is, if it is concluded, for example, that the speed of motor 51 would be increased by 1%, the speed of motor 52 would be similarly increased (to assure the same slant on the developed video tracks) and tape tension would be decreased by 0.5%. Such a linear control relationship may be implemented in processor 59 with a simple resistive network.

What is claimed is:

1. A method for controlling tape tension and relative speed during recording editing of a prerecorded video tape on a helical video tape recorder employing a flying erase head and having means for tape tension and relative speed control and including a standard timing signal source, comprising the steps of:

placing said helical video tape recorder into an insert recording editing mode:

detecting horizontal synchronization signals embedded in the diagonal tracks on said prerecorded video tape prior to flying erasure of video information to be replaced;

comparing said embedded synchronization signals with timing signals from said standard source to develop an error signal proportional to the timing difference therebetween; and controlling responsive to said error signal the tape tension and relative speed of said helical video tape recorder so as to diminish said error signal.

2. A method for recording editing by insertion of a selected video segment onto a video tape prerecorded on a helical tape recorder employing a flying erase head while controlling the tension and relative speed of said video tape comprising the steps of:

placing said helical tape recorder into an insert recording editing mode:

detecting synchronization signals embedded in the diagonal tracks on said prerecorded video tape prior to flying erasure of video information to be replaced;

controlling tape tension and relative speed in response to signals obtained from said detecting step; and recording on said video tape said selected video segment in place of prerecorded material.

3. A method for recording editing by insertion of a selected video segment onto a video tape prerecorded on a helical tape recorder employing a flying erase head while controlling the tension and relative speed of said video tape comprising the steps of:

placing said helical tape recorder into an insert recording editing mode;

detecting horizontal synchronization signals embedded in the diagonal tracks of said prerecorded video tape prior to flying erasure of video information to be replaced;

controlling tape tension and relative speed in response to signals obtained from said step of detecting;

erasing portions of said prerecorded tape after said step of detecting; and recording on said erased video tape said selected video segment in place of erased material.

4. In a helical video tape recorder system having means for tape tension and relative speed control, employing a flying erase head and including a standard timing signal source for line synchronization pulses: a method for recording editing by insertion of a desired video segment onto a tape carrying a video signal which includes prerecorded synchronization pulses on diagonal tracks thereof comprising the steps of:

placing said helical video tape recorder system into an insert recording editing mode;

detecting said prerecorded synchronization pulses;

developing an error signal responsive to the difference between said detected synchronization pulses and a timing signal from said standard timing source;

applying said error to said means for tape tension and relative speed control to reduce said error signal;

erasing by means of said flying erase head a portion of said prerecorded video signal on individual tracks after said step of detecting said prerecorded synchronization pulses; and recording on the erased portion of said video tape said desired video segment.

5. The method of claim 4 wherein said error signal is responsive to the timing difference between said detected line synchronization pulses prerecorded on said video tape and timing pulses from said standard timing source.

* * * * *